Dec. 22, 1964 C. L. ROBERSON ETAL 3,162,038
VISCOMETER
Filed June 30, 1960 3 Sheets-Sheet 2

CLETIS L. ROBERSON,
SHELDON A. CANFIELD &
JAMES D. RILEY
INVENTORS

BY

ATTORNEYS

CLETIS L. ROBERSON,
SHELDON A. CANFIELD &
JAMES D. RILEY
INVENTORS

BY
ATTORNEYS

United States Patent Office 3,162,038
Patented Dec. 22, 1964

3,162,038
VISCOMETER
Cletis L. Roberson, Sheldon A. Canfield, and James D. Riley, Newark, Ohio, assignors to Owens-Corning Fiberglas Corporation, a corporation of Delaware
Filed June 30, 1960, Ser. No. 39,923
11 Claims. (Cl. 73—59)

This invention relates generally to apparatus for determining and reporting viscosity. More particularly, the invention pertains to a viscosity measuring instrument and associated electrical control and recording devices for use in industrial processes in which a continuous flow or supply of liquid is involved.

While the viscometer of this invention is capable of expeditiously providing accurate viscometry data on liquids of a wide range of properties, it is especially adapted for determining viscosity of liquids at high temperatures, and particularly that of molten glass. It is also capable of reporting viscosity at a distance from the point of contact with the liquid and has an adjustable reporting range under remote control. The apparatus is therefore highly serviceable where hazardous conditions prevail in the area of the liquid.

The electrical devices forming a part of the invention may be used advantageously for actuating temperature modifiers and other apparatus controlling conditions which affect the viscosity of the liquid being tested and through such control maintain viscosity in a desired range.

In view of the extreme environmental conditions involved in the determination of the viscosity of molten glass in manufacturing processes and the fact that the apparatus of this invention is capable of performing under such demanding conditions, the invention will be presented herein in connection with such use.

As the forming characteristics of a glass batch are heavily dependent upon viscosity relationships, it is quite essential that the molten glass delivered by a melting furnace be of a suitable viscosity. Temperature has in the past been utilized as a viscosity guide, as the relationship between viscosity and temperature for any particular glass composition may be defined in the laboratory.

The viscosity of glass changes radically with temperature. That of a particular standard glass may increase three-fold for each drop of 180° F. in temperature in the melting range. This means that such molten glass at 2600° F. may have only one-third of the viscosity of the glass at 2420° F.

Even a slight change from the approved degree of viscosity may make the difference between success and failure in a glass forming operation. All of the usual processes of glass working—blowing, pressing, drawing, fiberizing, and rolling—are dependent upon viscosity control.

Viscosity is an especially critical factor in glass fiber forming processes, in which the relationship between temperature and viscosity is of most interest in the region where the viscosity lies between one poise and two thousand poises, although the viscosity up to ten thousand poises is of pertinence from the laboratory standpoint.

Experimental work in many laboratories during the past thirty years has shown that the viscosity of glass varies markedly with its chemical composition with the various ingredients individually affecting the viscosity quite differently.

It may be seen therefore that a variation in viscosity determinations without change in temperature is a positive indication of a difference in chemical composition as well as of forming characteristics of the glass at production temperatures.

Unforeseen and uncontrollable variations in production conditions occur which disturb glass compositions. The time lapse between production use of the molten glass and laboratory evaluation renders laboratory tests somewhat ineffective as operating control measurements. Consequently, effective operational control of viscosity requires measurement directly in the production process.

Accuracy and rapidity considerably enhance the value of such viscosity checks. Precise measurements may yield additional information regarding glass formation and structure, while expeditious reporting lessens the chance of interim composition change through volatilization and thereby contributes to the integrity of the findings. Rapid determination of viscosity naturally promotes earlier solving and correction of production failures.

Methods and apparatus previously employed for determining the viscosities of glass stock have been oversize and cumbersome. This prior equipment, besides being high in first cost as well as maintenance expense, has required large samples of glass and considerable time for operation; and, most importantly, they have not been suitable for use in production because of their deficiencies in ruggedness, calibration stability, and simplicity, all considered necessary in a production instrument.

Prior viscometers also have failed to function properly in the full viscosity range of molten glass. They have been able to provide only an indication of the viscosity, being deficient in sensitivity, and frequently are unduly influenced by specific gravity. As a rule, the operation of such earlier apparatus has required a certain technique which must be duplicated if consistent results are to be obtained.

It is then a prime object of the invention to provide a viscometer suitable for use with molten glass in a manufacturing process.

A more specific object of the invention is to provide apparatus which determines molten glass viscosity from the drag effect due to the viscosity upon a rotating bob immersed a predetermined depth therein.

Another object is to provide viscometry apparatus which has an electro-magnetic coupling between a driving motor and a rotated bob.

A further object is to provide rugged apparatus of simple design which operates over a long period without need of maintenance and while retaining calibration stability.

A still further object of this invention is to provide production control apparatus capable, without change of parts, of measuring the viscosity of glass in wide ranges, from a fraction of a poise to eight thousand or more poises.

Another object of the invention is to provide an apparatus with adjustable electrical components to determine viscosity in different ranges, to lower or raise the zero point of calibration, and to record variations from a reference standard.

A further object is to provide a viscometer capable of operating in an environment of extremely high temperature.

Another object is to provide a rotation viscometer which will give results of sufficient accuracy to be converted substantially directly into absolute units without the use of correction factors.

A still further object of the invention is to provide a viscometer wherein all supports and guides for the rotatable member are positioned not only out of contact with, but also insulatedly spaced from the material under test.

The apparatus provided by this invention employs a rotating type of viscometer which is considered most easily applied to such measurements in glass, and one that has been found to function most dependably and with high precision. It has only two main moving parts, has frictionless fluid bearings and is protected by water cooling coils.

A further important feature of the instrument is that the rotating bob is mechanically and electrically isolated, being driven by an electro-magnetic coupling and supported on air bearings.

Truly sensitive readings of great accuracy and precision are obtained that are not negated by operating technique or varied by the specific gravity of the test material.

The viscometer of this invention is capable of accurate and continuous reporting of viscosity as may be of great value in industrial processes or research studies. It is designed for reporting and recording at a station removed from the location of the liquid being examined when hazardous conditions exist at such location.

The viscometer instrument of the subject apparatus is protected by water coils and air flow and is otherwise constructed to function in an atmosphere of injurious nature and to contact a high temperature liquid for the determination of its viscosity.

The apparatus is particularly suited and advantageous for molten glass where viscosity is closely identified with temperature, composition, and workability and provides a basis for accurate and rapid monitoring, control and adjustment of composition and temperature.

The objects and advantages of the invention will be made more apparent in the following description and by reference to the drawings, in which:

FIGURE 1 diagrammatically illustrates an embodiment of the invention including a viscometer instrument and electrical control and recording components which are preferably used in association therewith;

FIGURE 5 is an horizontal section through the instrument of FIGURE 4 taken on the line 5—5 thereof to illustrate the design of the displacement transducer field coils and rotor;

FIGURE 6 is a similar sectional view of the elastic generator portion of the instrument providing an electro-magnetic coupling, taken on the line 6—6 of FIGURE 4; and FIGURE 7 is a like sectional view on the line 7—7 of FIGURE 4 to show the supplemental torque generator.

Figure 1:
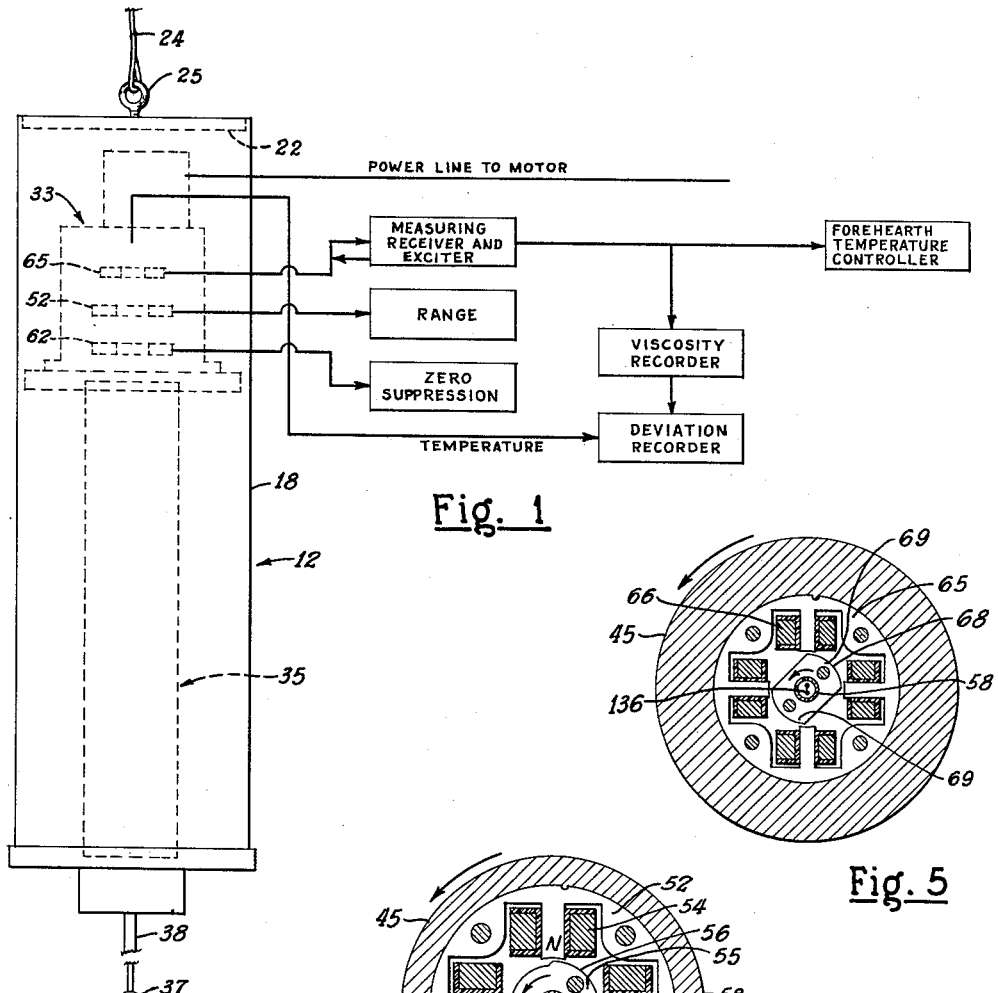

Referring to the drawings in more detail, the diagrammatic presentation of FIGURE 1 depicts the main viscometer instrument 12 with various electrical control and recording devices with which such an instrument may be used in accord with this invention.

Figure 2:
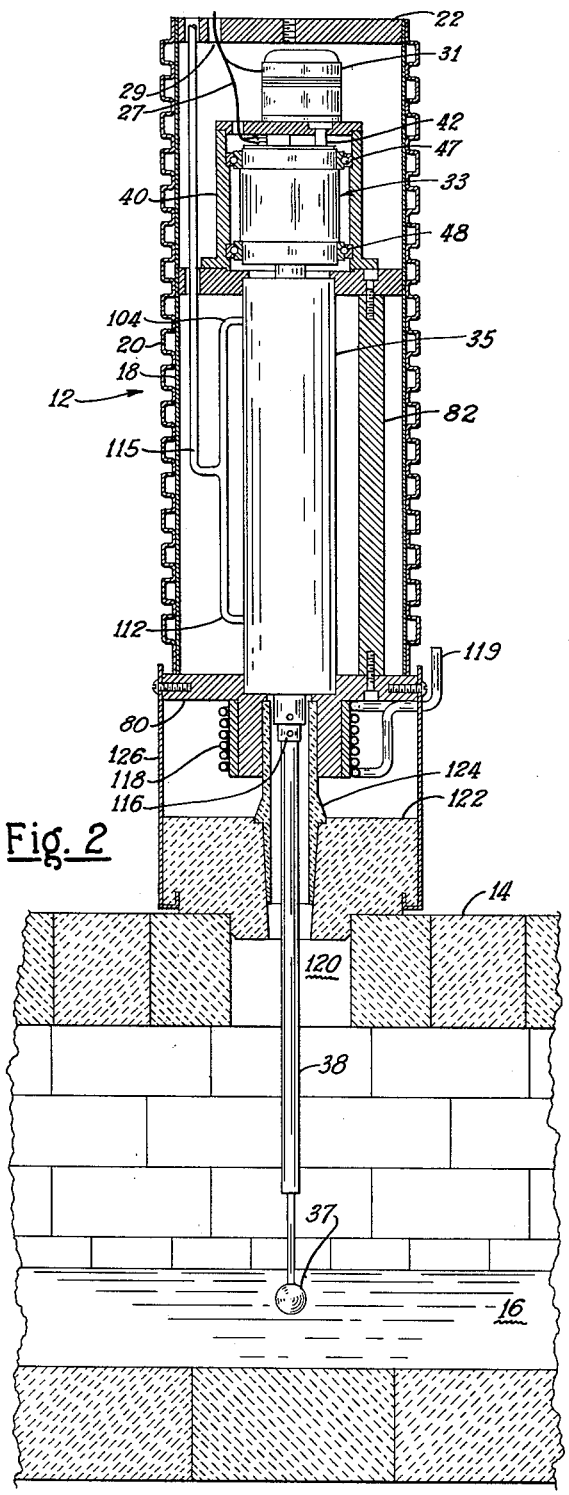
FIGURE 2 is an elevational view with some portions shown in vertical section of the viscometer instrument of FIGURE 1 shown mounted on the forehearth of a glass furnace for determining the viscosity of the molten glass flowing therethrough.

The weight of the viscometer 12 is supported, at least during installation, by a cable 24 secured to an eye bolt 25 fastened to the upper closure member 22 of the instrument. As shown in FIGURE 2, the viscometer has a main outer casing 18 incorporating a water cooling jacket 20. The assembly 27 of electrical wires for power, control and recording circuits is led through an opening 29 in the closure 22.

The main components of the instrument 12 are the driving motor 31, stator assembly 33, air bearing assembly 35, and the rotor assembly from which is suspended the bob 37 through its supporting spindle 38.

The motor 31 is supported upon the cylindrical housing 40 of the stator assembly 33. This motor is a synchronous, alternating current design; and in a preferred form, is wound to operate, selectively, at any one of four different speeds. It has internal gearing which reduces these four speeds respectively to ninety, forty-five, thirty, and twenty-two and one-half revolutions per minute. The power of the motor is only slightly above its normal top load requirements so when it becomes over-loaded, it stalls quickly without excess temperature and without first applying a dangerous torque.

Figure 4:
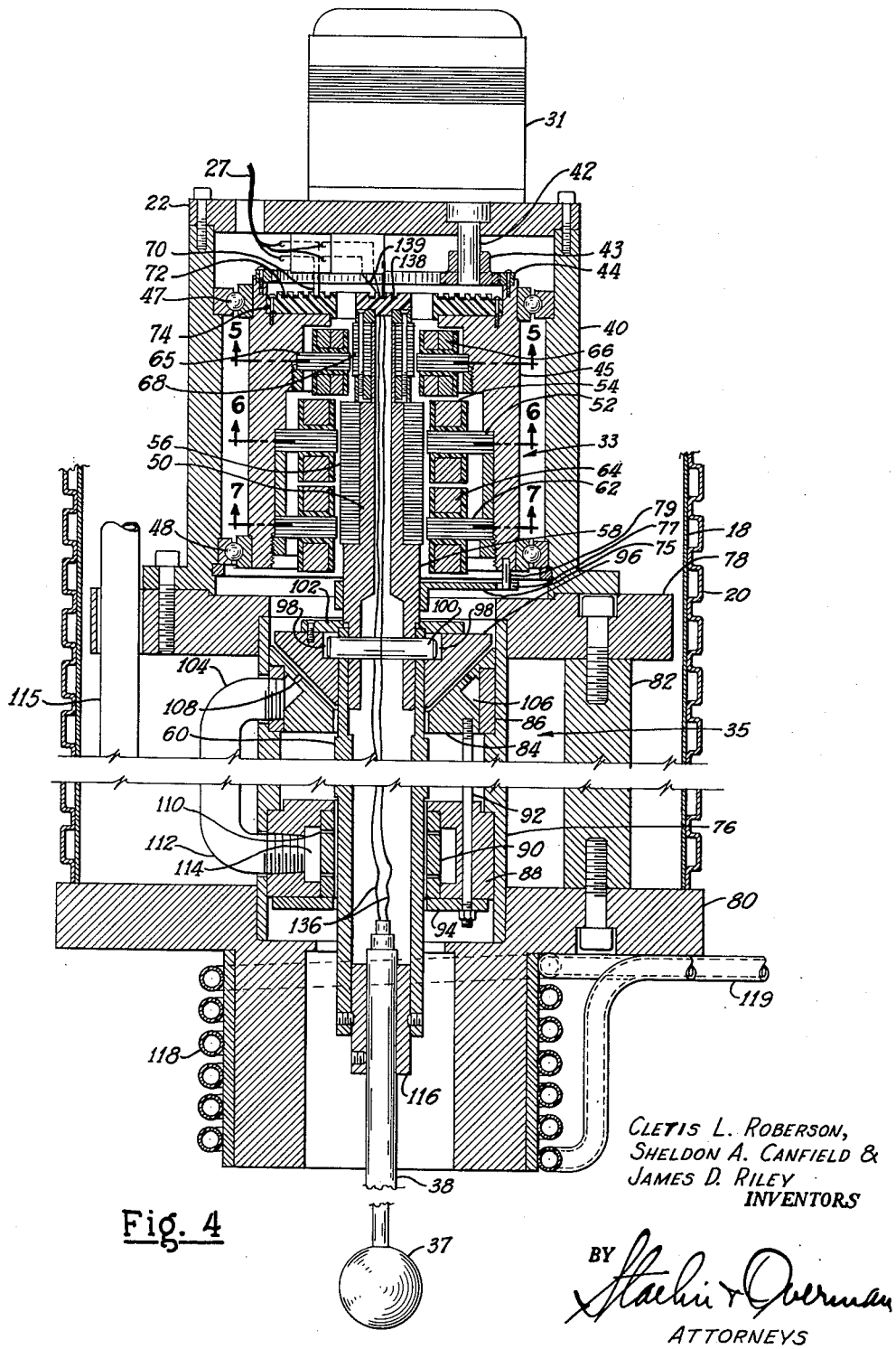
FIGURE 4 is an enlarged, vertically contracted, vertical section, with portions broken away, of the viscometer depicted in FIGURE 2.

As may be seen in FIGURE 4, the shaft 42 of the motor has on its lower end a pinion gear 43, which drivingly engages the internal ring gear 44. The ring gear 44 is firmly attached by cap screws to the stator housing 45 which accordingly turns with the gear. The gear ratio, when the instrument is to be used for testing production glass viscosity, reduces the selected motor output speed of ninety revolutions per minute to twenty-five.

The stator assembly 33 is mounted in two sets of bearings 47 and 48. The rotor assembly 50 is mounted for free rotation on the vertical axis of the stator assembly 33. Rotation of the rotor assembly 50, in following accord with the rotation of the stator housing 45, is induced by a magnetic field generator 52 carried by the stator housing 45. As depicted in FIGURE 6, this generator comprises four annularly spaced coils 54 carrying direct current. The coils form alternate north and south poles.

The rotor assembly 50 aligns itself with and follows the rotating stator housing 45, through the effect of the magnetic flux, created by coils 54, passing through salient poles 55 formed by peripheral projections of core laminations 56 which are mounted on the shaft 58 of the rotor assembly. The core discs are composed of suitable alloys of high magnetic permeability. Due to recessed areas bordering the projecting poles of the core laminations, the pull of the magnetic flux increases on slippage of the rotor assembly and thereby establishes a spring-like, electro-magnetic coupling between the stator and rotor.

The rotation of the rotor assembly is directly transmitted to the bob 37 through the tubular coupling 60 joining the shaft 58 to the bob spindle 38. In the present instance, the magnetic field generator 52 is energized to transmit a maximum torque of 67,500 dyne-centimeters. The resisting torque of the viscosity of the liquid in which the bob 37 is immersed will cause a one degree lag or deviation of the rotor assembly in following the rotating stator for each 12,500 dyne-centimeters of such resistance torque.

Under the particular specifications of this embodiment, with the motor shaft operated at ninety revolutions per minute and the speed geared down exteriorly to twenty-five revolutions, this range of torque is suitable for determining the viscosity of molten glass from a fractional centipoise to one thousand poises. Through adjustment of the electrical control apparatus delivering current to the coils 54 of the generator 52, the elastic torque may be varied for more exact viscosity determination in a restricted portion only of the range up to one thousand poises.

This control utilizes the condition that the spring constant of the electro-magnetic coupling formed by the generator 52 is proportional to the current squared through the coils. The current control apparatus is identified in FIGURE 1 as the block marked "Range" and involves a potentiometer associated with the power supply.

A second magnetic field generator 62, with a set of coils 64 is provided for applying, when desired, a supplemental driving torque upon the rotor assembly 50. The response of the rotor thereto arises from the magnetic field acting on the lower portion of the core lamination 56. This electro-magnetic coupling acts through the repulsion of the magnetic flux. As indicated in FIGURE 7, there are two opposite north poles created by the current of coils 64 while the other two poles are not energized. The driving torque applied by generator 62 to the rotor assembly may, for example, be equal to that of the primary generator 52.

With the supplemental generator 62 functioning, the range of viscosity of molten glass measurable by this viscometry instrument, at the selected speed, is increased to between one thousand and two thousand poises. This is made possible through the action of the added torque in raising the starting point of angular deviation of the rotor. The zero position of viscosity recording is thereby depressed and the starting point of viscosity measurement elevated. An intermediate range of viscosity may be reported by reducing the amount of energization of the poles of the generator 62. The potentiometer controlled power supply apparatus for generator 62 is designated as "Zero Suppression" in FIGURE 1.

The rotational drive of the rotor assembly 50 derived from the field generator 52, above the supplemental drive which may be provided by field generator 62 is elastic in nature, and there will be, with an increasing load, a graduated angular slip or deviation by the rotor assembly 50 from its exact following alignment with the revolving stator assembly 33. As the resistance to the rotation of the bob 37 is increased by a higher viscosity of the molten glass, the angular deflection is enlarged. The amount of the deflection is measured by the variation in the current flowing through the field 65 composed of coils 66 located above the generator 52.

This variation in current results from angular displacement of the poles 68 projecting from the group of core laminations 68 mounted near the top of the rotor shaft 58 from magnetic alignment with the poles of the reporting field, as shown in FIGURE 5.

The current supplied the elastic coupling generator 52 and the supplemental torque generator 62 is direct, while the excitation current flowing through the coils 66 of the displacement transducer field 65 is preferably alternating. These electrical currents arrive through lead wires in the group 27 and are delivered through brushes 70 contacting slip rings 72 in the slip ring holder 74.

The electric instrument indicated by the block of FIGURE 1 marked "Measuring Receiver and Exciter" supplies the excitation current to the coils of the deviation reporting field 65 and also translates the voltage output signal into terms of viscosity for reporting on the "Viscosity Recorder."

To maintain the associated poles of the rotor and stator in coactive range, relative rotational movement between the rotor and stator is limited to a maximum of twenty degrees by the forked member 75, which may be seen in FIGURE 4. This has a collar section encircling and fixed upon the rotor by a set screw and a fork 77 extending laterally, the legs of which span a pin 79 depending from the bottom edge of the stator housing 45. The angular relationship between the rotor and stator is thus held against accidental disarrangement.

The rotor assembly 50, the coupling 60, and the spindle 38 depending therefrom are journaled and supported in the air bearing assembly 35. This bearing assembly includes an outer tubular casing 76, which is held between upper plate 78, on which housing 40 is mounted, and the base member 80. The plate 78 and the member 80 are secured together in definite spaced relation by three posts 82, to which the plate and member are fastened by machine screws.

A cone bearing 84 is positioned within the upper end of the casing 76. Encircling the cone bearing 84 is ring 86. Within the lower end of the casing 76 is a bearing cage 88 surrounding sleeve bearing 90. Cone bearing 84 and the ring 86 are held against an upwardly facing shoulder on the interior of the casing 76, while the bearing cage 88 with its associated sleeve bearing 90 are held against a downwardly facing shoulder of the casing.

The location of these parts is set by a series of tie rods 92 which are threaded into the cone bearing 84 and extend down through bores in the bearing cage 88 and beyond the bottom retainer 94. Nuts on the lower end of the tie rods 92 are tightened against the retainer 94.

Carried by the tubular coupling 60 above the cone bearing 84 is a conforming cone member 96. There is a pair of opposed openings 98 within the cone member 96, which receive the projecting ends of the pin 100 by which the shaft 58 is joined to the tubular coupling 60. The opposed openings 98 are closed from above by the keeper ring 102 which is fastened to the cone member 96 by cap screws. The cone member 96 is thus held in position on the tubular coupling 60 against the pin 100.

Lubricating air, at a pressure, in this embodiment, of preferably sixty pounds per square inch, is led between the cone bearing 84 and the cone member 96 from the branch conduit 104. This air travels around the annular passage 106 and is directed therefrom through the ports 108. This portion of the bearing assembly centers the rotor and spindle assembly and counters both radial and axial thrust.

The air lubricant is delivered interiorly of the radial thrust, sleeve bearing 90 through ports 110 therein. This air flows from the branch conduit 112 into the annular passage 114. By having the interior ends of the ports 108 and 110 enlarged by counterboring, an turbining effect of the air streams is eliminated.

As shown more completely in FIGURE 2, the branch conduits 104 and 112 receive air from the main supply piping 115.

The air escaping from the bearings flows along the rotor shaft and serves to purge the area of deleterious fumes rising from the glass furnace.

The lower end of the coupling 60 is joined to the bob spindle 38 through bushing 116 which is attached to the coupling and the spindle by set screws. Further cooling of the viscometer unit 12 is provided by the water-carrying copper coil 118 which is turned around the reduced lower extension of the base member 80. Water is delivered to the coil 118 by the supply tubing 119.

As shown in FIGURE 2, the bob 37 of the instrument is submerged in the flowing glass 16 below an opening 120 in the crown of the forehearth 14 through which the bob spindle 38 extends. The instrument is centered in the opening 120 by the refractory saddle block 122. A tapered spud 124 fits into the block 122 and extends upwardly within the base member 80. A cylindrical shield 126 extends down from the periphery of the member 80 and is turned under an annular shoulder around the bottom of the block 122.

Figure 3:
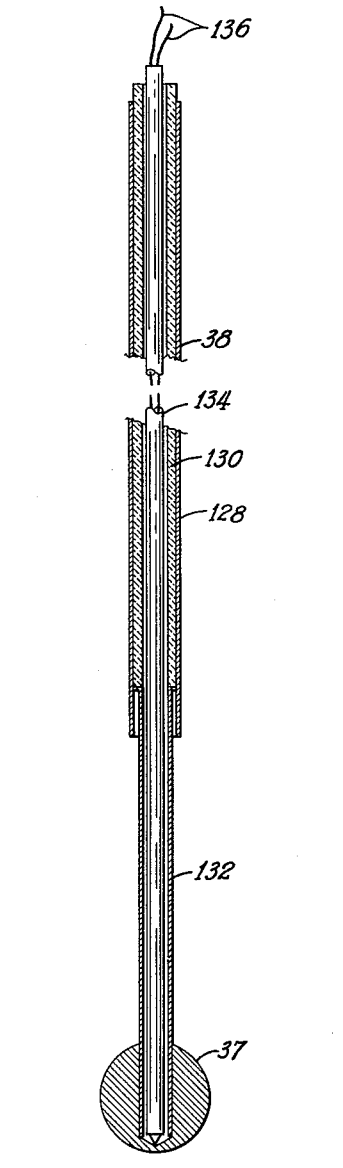
FIGURE 3 is a vertical section of the spherical bob of the viscometer of FIGURE 2 which is immersed in the fluid glass, and the spindle on which the bob is supported.

As shown in FIGURE 3, the spindle 38 has an upper portion ensheathed in a platinum tube 128 over a refractory tubular body 130. The lower end 132 of the spindle connected to the bob 37 is of reduced diameter. In this embodiment, the bob has a diameter of 0.970 of an inch and the diameter of the adjoining portion of the spindle is 0.188 of an inch. A platinum alloy with ten percent rhodium is considered most serviceable as the composition of the bob 37 and the spindles 38. Other alloys and straight platinum may withstand the corrosive effect and high temperature of the glass quite as effectively.

A thermocouple 134, preferably employing a platinum and platinum-rhodium couple, is lodged within the bob and spindle and has lead wires 136 which run upwardly through the hollow coupling 60 and the hollow rotor shaft 58. The current carried by these wires travels through the slip rings 138 on the upper end of the shaft 58, which are contacted by the brushes 139, to a cold junction and potentiometer for signal interpretation.

In the use of this apparatus for the purpose of measuring the viscosity of glass passing through a forehearth, the spindle 38 is of selected length to place the center of the bob 37 two inches below the surface of the flowing glass. The level of the glass is maintained with no greater variation than one-quarter of an inch; and with the level so controlled, the viscosity recording will be accurate with no more than one percent error.

The temperature within the forehearth generally exceeds 2,000° F. At this temperature there are very active volatile substances from the glass batch in the atmosphere above it. The platinum casing 128 of the spindle stands up against the high temperature within the forehearth and is also chemically resistant to the volatile matter coming in contact with it.

Although the temperature exterior of the forehearth may be 350° F. or higher, the viscometer mechanism above the forehearth is held at a normal room temperature through the cooling provided by water jackets 20 and 118. With such an unvarying ambient temperature, the components of the instrument are able to continue in efficient service over a long period.

The viscometer instrument 12 is so located in respect to the forehearth to suspend the bob in the part of the forehearth first receiving the molten glass through the flow channel from the main portion of the furnace. The glass discharge outlet is generally located near the outer end of the forehearth with the glass forming operation positioned immediately adjacent thereto. Alternately, there may be several glass discharge outlets to a series of forming operations spaced along the length of the forehearth.

For producing glass fibers, a typical forehearth is about twenty feet long and has nine pairs of ported bushings placed about two feet apart along the length of the forehearth.

In order to maintain the proper temperature and therethrough the viscosity of the fluid glass as it is discharged in threaded form from the ports of the bushings, the later are equipped with electric heaters. Also, to stabilize the temperature of the glass flowing through the forehearth, there may be gas burners stationed above and along the sides thereof. Resistance heaters with electrodes immersed in the glass are also used for this purpose.

At the entrance of the forehearth, the glass flow is customarily at a speed of fifteen inches per minute. With a series of outlets, the glass flow slackens gradually until reaching a static condition at the outer end of the forehearth.

It may be seen that it is desirable to have the viscometer as much as possible ahead of the point of use of the glass in order to provide a better opportunity to vary the application of heat to the glass between the location of the viscometer and the point of use. The temperature may be thus increased or decreased to bring the viscosity to the desired range from any deviation from that range which has been indicated by the viscometer reading.

In connection with glass fiber production, the first pair of bushings in the forehearth may be so close to the location of the viscometer at the forehearth entrance that time for raising or lowering the temperature of the glass before it reaches this pair of bushings is extremely limited; for this reason, regulation of the electric heater of the bushing itself must be relied upon for providing any temperature change, the need of which is indicated by the viscometer determination. This also may be true of the second and third pair of bushings.

However, as the distance increases from the location of the viscometer to the point of glass discharge and with the reduction in the speed of the glass movement, sufficient time is available for the temperature of the fluid glass to be altered by regulation of the gas burners or of the resistance heating elements applying heat to the glass flowing in the forehearth, although in some situations, it may be necessary to adjust the heat output of both the bushing heater and the forehearth heating units. The "Forehearth Temperature Controller" of FIGURE 1 indicates the apparatus including viscosity signal receiver, solenoid gas valve, solenoid switches, and actuators therefor which are required for regulation of the output of the various heating devices.

While probably less relevant to glass processing than to other industrial liquid compositions under viscosity control, automatic regulation of the amount of one or more batch constituents may be utilized for maintaining viscosity in a desired range. This arrangement is particularly applicable where the quantity of a minor ingredient has a disproportionate effect upon viscosity. The apparatus to execute this control includes viscosity signal interpreting instruments, and actuators responsive thereto to open and close supply valves.

With the glass moving past the viscometer bob at a speed of fifteen inches per minute, the Reynolds number of the spherical bob 37 is sufficiently low to make Stokes' law applicable in computing the drag thereon. It is thus determined to be 0.375 of a pound with the specific glass velocity and when the glass has a viscosity of 35 poises. Likewise, the Reynolds number of the immersed portion of the spindle permits Stokes' law and the drag coefficient relationship between a sphere and a cylinder to be utilized in computing the drag on the spindle portion to be 0.638 of a pound.

The total drag of the flowing glass upon the bob 37 and the portion of the lower end of the spindle immersed in the molten glass is then 1.01 pounds.

The moment on the rotor assembly caused by the lateral force or drag upon the bob and its supporting spindle is effectively countered by the length and design of the air bearing structure. Such a fluid bearing is quite frictionless in function.

The spherical bob presents a constant area facing the advancing glass flow regardless of any deflection of the spindle due to the lateral thrust of the glass movement. This would not be true of a bob of any other shape including those of conventional cylindrical and disc form. Also, the mean depth of a spherical bob under varying deflection remains favorably low.

By equipping the Viscosity Recorder with a tapped slide wire arranged as an electro-mechanical analogue of the temperature viscosity curve of the glass under analysis, comparison of the actual temperature at the time of viscosity measurement with the theoretical temperature corresponding to the measured viscosity may be made. The comparison between the actual and theoretical temperatures could also be made electronically through the use of amplifiers or function generators. The difference between these two temperatures is recorded on the Deviation Recorder in degrees.

The deviation from theoretical viscosity thus secured is a valuable tool to both operating and supervisory personnel. To the operators of the process, this measurement is a direct indication of the correction in temperature required to obtain the forming viscosity desired. It is also a check of the furnace and batching operations in that the deviation is based on the entire viscosity-temperature curve rather than relating to only one arbitrary point.

Among the features which should be emphasized in final review of the invention are the mechanical separation of the motor and the bob supporting shaft; the elastic generator constituting a magnetic spring between the motor and the shaft; the air bearings for the shaft; the protection against heat provided by the water coils, by the composition of the spindle and bob, and by spacing between the bob and the main body of the instrument.

Other important features include the spherical shape of the bob providing a dimensionally uniform contour and aspect regardless of the deflection of the bob by the glass flow; the electric field reporting angular displacement of the shaft in relation to the drive from the motor; the additional field generator for applying an extra torque; the electric apparatus for interpreting the resisting torque in terms of viscosity, for recording the viscosity in terms of temperature, and for controlling the range of viscosity, with such recording and control apparatus all located at a point remote from the position of the instrument.

In further summary, it should be noted that the instrument is sufficiently rugged to operate without maintenance over a long period, and is capable of determining viscosity in a broad range without change of parts. The viscometer of this invention acts quickly and accurately and includes electrical apparatus for charting viscosity in terms of temperature and denoting the degree of temperature difference between that recorded and the temperature which a standard composition of the same viscosity should have.

With the exception of the motor gear train, there are only two moving parts in the system. No mechanical coupling exists between these two parts. There are no calibrated springs in the mechanical sense, and no internal adjustments. Once assembled, the viscosity measuring instrument should require no maintenance or attention during the life of the drive motor.

The instrument may be employed under a wide variation of conditions. It provides simplicity of adjustment and adaptability to the complete range of glass composition.

Through its use information is supplied about viscosity disturbance as much as one-half hour before temperature readings would indicate the possibility of viscosity change, and the viscosity determination is more accurate than when derived from temperature.

Various modifications and substitutions may be made in the particular embodiment disclosed within the province of the invention. Such changes may comprise a cylindrical bob in place of the preferred bob of spherical shape, a consolidation of the electro-magnetic coupling with the reporting field, the substitution of a permanent magnet coupling for the electro-magnetic design, the elimination of the supplemental torque generator, a different motor design providing a greater range of speeds, and a more standard design of bearings than the air pressure type for the bob shaft.

The induction effect upon an electric field is considered the most suitable arrangement for determining the angular displacement of the shaft supporting the bob. However, such position reporting may also be secured through associated electrical elements in which properties of resistance or of capacitance are modified proportionately by the angular displacement.

While air alone has been specified as the lubricant gas for the rotor bearing, it should be realized that other gases may be desirable under certain circumstances. For instance, the greater density of argon would enable it to function under heavier loads than air could sustain. The inert properties of argon and helium, and the reducing capability of hydrogen would give added protection against oxidizing fumes. The gas selected should primarily be non-destructive of the apparatus or process, and secondarily, where possible, should be of a nature to preserve the apparatus and facilitate the processing procedure.

The entrance of the forehearth has been given as the preferred site for the viscometer described herein. There, no doubt, are situations where it may be more advantageous to place the viscometer directly in the glass tank, or possibly in the tank refiner section or in the flow channel to the forehearth.

These as well as many other modifications which would readily occur to those skilled in the art are considered to be within the spirit of the invention and the scope of the appended claims.

We claim:

1. An apparatus for determining viscosity including a rotatable member to be immersed in a liquid being tested, a shaft on which the member is supported, an electric motor for supplying the driving force for rotating the shaft and the member, a motor shaft extending from the motor, an electro-magnetic coupling between the shaft supporting the rotatable member and the motor shaft and positioned externally of the motor, said electro-magnetic coupling having a yielding spring-like property proportionally responsive to the amount of resisting torque imposed upon the rotating member by the viscosity of the liquid being tested, and electrical means associated with the shaft supporting the rotatable member and responsive to the angular lag of the shaft permitted by the yielding response of the electro-magnetic coupling and converting the angular lag to terms of viscosity.

2. Apparatus according to claim 1 in which the electrical means includes an electrical field driven by the motor and a magnetically permeable core with salient poles mounted on the shaft supporting the rotating member and rotating with said shaft centrally of the electrical field, the voltage of said electrical field varying proportionally to the amount of angular lag of the shaft and the corresponding angular displacement of the magnetically permeable core in relation to the electrical field.

3. An apparatus according to claim 2 in which there is another electrical field driven by the motor and controllably transmitting additional torque to the shaft.

4. A viscometer having a rotatable member adapted to be immersed in a liquid to be tested, a vertical shaft upon which said member is mounted, a motor for driving said shaft, means supporting the motor, a gaseous fluid bearing vertically supporting said shaft, and electrical means associated with the shaft and energized proportionately to the rotational lag of the shaft due to resistance torque imposed upon the shaft by the viscosity of the liquid, said electrical means converting such rotational lag to terms of viscosity.

5. An apparatus for measuring viscosity including a rotatable member for immersion in the liquid of which the viscosity is to be measured, a shaft supporting the rotatable member, an electric motor for supplying a driving force to the shaft, bearings upon which the shaft is carried, a magnetic field creating element positioned exteriorly of the motor and directly rotated by the motor, a portion of the shaft disposed centrally of the element and free of contact therewith, said portion being magnetically responsive to the element to transfer the rotation thereof to the shaft and the rotatable member, and separate electrical means also directly driven by the motor energized proportionately to the resistance to rotation of the rotatable member due to the viscosity of the liquid, and converting said resistance to terms of viscosity.

6. A viscometer having a rotatable member for immersion in a liquid being tested, a shaft upon which the rotatable member is mounted, a motor for supplying a driving force to rotate the shaft and the member, electrical coil means connected with the motor and rotated thereby, magnetically permeable elements on the shaft in such responsive association with the electrical coil means that the shaft is rotated therethrough, and electrical means proportionately responsive to the angular lag or displacement of the shaft in following the rotation of the electrical coil means and converting the magnitude of the angular lag to terms of viscosity.

7. A viscometer of the type measuring the viscosity of a liquid through the resistance of the viscosity of the liquid to the rotation of an element immersed therein, including a rotatable element for immersion in a liquid of which the viscosity is to be determined, an electric motor for rotating the element, an electro-magnetic coupling positioned exteriorly of the motor between the motor and the element and transmitting rotating drive from the motor to the element, and a vertically supporting bearing for the element, said bearing being of a gaseous fluid design, whereby said element, when rotated, is free of mechanical contact with both the electric motor and the supporting bearing.

8. A viscometer according to claim 7 having a casing for the motor, the main portion of the shaft and the bearings; and a cooling water jacket ensheathing the casing.

9. A viscometer according to claim 7 including means directing a purging current of gas along the shaft.

10. An apparatus according to claim 1 including means for changing the strength of the electro-magnetic coupling.

11. An apparatus according to claim 1 including a second, separately controllable, electro-magnetic coupling between the motor shaft and the shaft supporting the rotatable member.

References Cited in the file of this patent

UNITED STATES PATENTS

| | | |
|---|---|---|
| 1,750,973 | Soubier | Mar. 18, 1930 |
| 1,888,431 | Osbourne | Nov. 22, 1932 |
| 1,941,896 | Miller | Jan. 2, 1934 |
| 2,435,416 | Thomson et al. | Feb. 3, 1948 |
| 2,708,361 | Boyle et al. | May 17, 1955 |
| 2,916,332 | Pavlecka | Dec. 8, 1959 |

FOREIGN PATENTS

| | | |
|---|---|---|
| 485,300 | Great Britain | May 18, 1938 |
| 691,025 | Great Britain | May 6, 1953 |
| 925,015 | Germany | Mar. 10, 1955 |